United States Patent
Kim et al.

(10) Patent No.: US 12,370,970 B2
(45) Date of Patent: Jul. 29, 2025

(54) APPARATUS AND METHOD FOR PROTECTING A PASSENGER OF A VEHICLE

(71) Applicants: HYUNDAI MOTOR COMPANY, Seoul (KR); KIA CORPORATION, Seoul (KR)

(72) Inventors: Jong Won Kim, Cheonan-si (KR); Youn Sic Nam, Daejeon (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 321 days.

(21) Appl. No.: 18/091,108

(22) Filed: Dec. 29, 2022

(65) Prior Publication Data

US 2024/0067114 A1    Feb. 29, 2024

(30) Foreign Application Priority Data

Aug. 29, 2022  (KR) .......................... 10-2022-0108260

(51) Int. Cl.
 *B60R 21/015*  (2006.01)
 *B60R 21/00*  (2006.01)
 *B60R 21/0136*  (2006.01)

(52) U.S. Cl.
 CPC .... *B60R 21/01554* (2014.10); *B60R 21/0136* (2013.01); *B60R 2021/0002* (2013.01); *B60R 2021/0027* (2013.01)

(58) Field of Classification Search
 CPC .......... B60R 21/01554; B60R 21/0136; B60R 2021/0002; B60R 2021/0027
 See application file for complete search history.

(56) References Cited

U.S. PATENT DOCUMENTS

| | | | |
|---|---|---|---|
| 9,463,760 B2 | 10/2016 | Choi et al. | |
| 10,611,269 B1* | 4/2020 | Larner | B60N 2/4207 |
| 11,718,289 B2* | 8/2023 | Cheon | B60R 21/0134 701/301 |
| 2009/0216408 A1* | 8/2009 | Ueno | B60R 21/0132 180/274 |
| 2011/0224869 A1* | 9/2011 | Inagaki | B60L 3/04 701/33.4 |
| 2016/0129868 A1 | 5/2016 | Choi et al. | |
| 2019/0016286 A1* | 1/2019 | Bartlett | G07C 5/085 |

(Continued)

FOREIGN PATENT DOCUMENTS

KR    101655569 B1    9/2016

*Primary Examiner* — Naeem Taslim Alam
(74) *Attorney, Agent, or Firm* — Lempia Summerfield Katz LLC (57) ABSTRACT

An apparatus and method for protecting a passenger of a vehicle that may minimize impact energy transmitted to a passenger by realizing rotation, position change, and space securing of an interior seat according to sensor detection of an external impact to a vehicle. The apparatus for protecting a passenger includes at least one seat movable in a length direction of the vehicle and rotatable disposed inside a vehicle, a plurality of sensing units installed in the vehicle and outputting a collision signal in case of a vehicle collision, and a controller determining a direction and location of a collision in the vehicle in case of the vehicle collision and controlling the at least one seat to be selectively moved and/or rotated according to the direction and location of the collision.

14 Claims, 9 Drawing Sheets

(56) References Cited

U.S. PATENT DOCUMENTS

| | | | |
|---|---|---|---|
| 2021/0009063 A1* | 1/2021 | Kim | B60R 21/0136 |
| 2021/0061207 A1* | 3/2021 | Humer | B60R 21/0136 |
| 2021/0297839 A1* | 9/2021 | Oba | H04M 11/04 |
| 2021/0370928 A1* | 12/2021 | Lee | G06V 20/58 |
| 2022/0063542 A1* | 3/2022 | Sakurai | B60R 21/01554 |

* cited by examiner

APPARATUS AND METHOD FOR PROTECTING A PASSENGER OF A VEHICLE

CROSS-REFERENCE TO RELATED APPLICATION(S)

This application claims benefit of priority to Korean Patent Application No. 10-2022-0108260 filed on Aug. 29, 2022, in the Korean Intellectual Property Office, the disclosure of which is incorporated herein by reference in its entirety.

TECHNICAL FIELD

The present disclosure relates to an apparatus and method for protecting a passenger of a vehicle that may minimize impact energy transmitted to a passenger by realizing rotation, position change, and space securing of an interior seat according to sensor detection of an external impact to a vehicle.

BACKGROUND

In order to improve safety in the event of a vehicle collision or accident, a technology for controlling devices, such as safety equipment, seats, and side windows by providing safety equipment, such as an airbag, and predicting a collision by a sensor, such as a radar sensor, has been proposed.

For example, there is an apparatus for protecting a passenger by detecting movement of a vehicle, predicting a vehicle state in the event of a collision or accident, and changing a height of a seat cushion or an inclination angle of a seat back based on a result of the predicted vehicle state. In this case, safety equipment, such as seat belts or airbags may also be controlled.

Alternatively, there is an apparatus for protecting a passenger by reducing impact energy transmitted to a passenger in a collision accident from the side by controlling an active suspension system of the vehicle to slightly lift one side of the vehicle immediately before a collision.

The former technology has a limitation in that the degree of freedom of movement of the seat is significantly limited and it cannot sufficiently respond to a collision from the side. The latter technology is limited to absorbing impact energy of a collision using a vehicle body in terms of safety against a collision, accident, or the like.

SUMMARY

Embodiments of the present disclosure provide an apparatus and method for protecting a passenger of a vehicle that may minimize impact energy transmitted to a passenger by realizing rotation, position change, and space securing of an interior seat according to sensor detection of an external impact to a vehicle.

According to an aspect of the present disclosure, an apparatus for protecting a passenger includes: at least one seat disposed inside a vehicle, being movable in a length direction of the vehicle, and being rotatable; a plurality of sensing units installed in the vehicle and outputting a collision signal in a case of a vehicle collision; and a controller determining a direction and location of a collision to the vehicle in the case of the vehicle collision, and controlling the at least one seat to be selectively moved and/or rotated according to the direction and location of the collision.

The seat may include: a rail installed inside the vehicle; a base frame mounted on the rail and being movable in the length direction of the vehicle by a forward/backward driving mechanism; a swivel core mounted on the base frame and being rotatable by a swivel driving mechanism; and a seat frame fixed on the swivel core.

In the case of the vehicle collision, a rotating direction of the seat may be set such that a front surface of the seat faces a center line extending in the length direction of the vehicle.

The plurality of sensing units may be installed by including at least one sensing unit on a front, a rear, and both sides of the vehicle, respectively.

The plurality of sensing units may be installed by including at least one sensing unit on each of the four corners and both sides of the vehicle, respectively.

The controller may determine the direction and location of the vehicle collision based on a position of a sensing unit outputting the collision signal. The controller may selectively control at least a seat closest to the sensing unit transmitting the collision signal to move and/or rotate.

The controller may move the selected seat away from a collision region of the vehicle.

The controller may rotate the seat so that a corner of the selected seat faces a collision region of the vehicle.

According to another aspect of the present disclosure, a method for protecting a passenger includes: detecting a vehicle collision and outputting a collision signal; determining a direction and a location in which a collision occurs to the vehicle based on the collision signal; and selectively moving and/or rotating at least a seat closest to a collision region according to the direction and location of the collision.

The selectively moving and/or rotating of the seat may include: determining whether the vehicle is in a front collision; in a case of the front collision, determining whether a collision region is in a center in a width direction of the vehicle or is deflected to either side; and moving the selected seat backward and/or rotating the selected seat according to a location of the collision region.

In the determining of whether the collision region is in the center in the width direction of the vehicle or is deflected to either side, when all of a plurality of sensing units located at both corners of a front of the vehicle output the collision signal, a controller may determine that the collision region is in the center in the width direction at the front of the vehicle, and when a sensing unit located at any one corner, among the plurality of sensing units located at both corners of the front of the vehicle, outputs the collision signal, the controller may determine that the collision region is deflected to either side in the width direction at the front of the vehicle.

In the moving backward and/or rotating of the selected seat according to the location of the collision region, when the collision region is in the center in the width direction at a front of the vehicle, at least a seat adjacent to the front of the vehicle may be controlled to move backward, and when the collision region is deflected to either side in the width direction at the front of the vehicle, at least a seat adjacent to the front of the vehicle and corresponding to the deflected collision region may be controlled to rotate while moving backward.

The selectively moving and/or rotating of the seat may include: when it is determined that the vehicle is not in a front collision, determining whether the vehicle is in a rear collision; in the case of the rear collision, determining whether the collision region is in the center in the width direction of the vehicle or is deflected to either side; and moving the selected seat forward and/or rotating the selected seat according to the location of the collision region.

In the determining of whether the collision region is in the center in the width direction of the vehicle or is deflected to either side, when all of a plurality of sensing units located at both corners of a rear of the vehicle output the collision signal, a controller may determine that the collision region is in the center in the width direction at the rear of the vehicle, and when a sensing unit located at any one corner, among the plurality of sensing units located at both corners of the rear of the vehicle, outputs the collision signal, the controller may determine that the collision region is deflected to either side in the width direction at the rear of the vehicle.

In the moving forward and/or rotating of the selected seat according to the location of the collision region, when the collision region is in the center in the width direction at a rear of the vehicle, at least a seat adjacent to the rear of the vehicle may be controlled to move forward, and when the collision region is deflected to either side in the width direction at the rear of the vehicle, at least a seat adjacent to the rear of the vehicle and corresponding to the deflected collision region may be controlled to rotate while moving forward.

In the selectively moving and/or rotating the seat, when it is determined that the vehicle is not in the front collision nor the rear collision, it is regarded as a lateral collision of the vehicle, and it is determined whether the collision region is in the center in a length direction of the vehicle or deflected to either side; and moving and/or rotating the selected seat according to the location of the collision region.

In the determining of whether the collision region is in the center of the vehicle in the length direction or deflected to either side, when only a sensing unit located in the center of one side of the vehicle outputs the collision signal, a controller may determine whether the collision region is in the center in the length direction at the side of the vehicle, and when a sensing unit located at any one corner outputs the collision signal, together with the sensing unit located on one side of the vehicle, the controller may determine that the collision region is deflected to either side in the length direction at the side of the vehicle.

In the moving and/or rotating of the selected seat according to the location of the collision region, a seat closest to a sensing unit transmitting the collision signal or a seat closest between a plurality of sensing units transmitting the collision signal may be controlled to rotate, and another seat adjacent to the sensing unit transmitting the collision signal or the rotated seat may be controlled to move away from the sensing unit transmitting the collision signal or the rotated seat.

BRIEF DESCRIPTION OF DRAWINGS

The above and other aspects, features, and advantages of the present disclosure should be more clearly understood from the following detailed description, taken in conjunction with the accompanying drawings, in which.

DETAILED DESCRIPTION

Hereinafter, the present disclosure is described in detail with reference to accompanying drawings. In adding reference numerals to the components of each drawing, it should be noted that the same components are given the same reference numerals even if the components are illustrated in different drawings.

In the present specification, a vehicle refers to various vehicles moving a transported object, such as a person, an animal, or an object, from a departure point to a destination. A vehicle may mean any moving device, machine, instrument, apparatus, or the like. Such vehicles are not limited to vehicles traveling on roads or tracks.

However, in the present disclosure, for convenience of description, a case in which a vehicle includes a plurality of seats, for example, six seats, is described. However, the present disclosure is not limited thereto and may also be applied to a case in which a vehicle includes less than six or more than six seats.

In addition, terms, such as first, second, and third may be used to describe various components, but these components are not limited in order, size, location, and importance by terms, such as first, second, and third, and are named only for the purpose of distinguishing one component from other components.

In addition, the terms "front", "rear", "front surface", "rear surface", "front and rear", "lateral" and the like used in relation to the direction are defined based on the vehicle or body. When a component, device, element, or the like of the present disclosure is described as having a purpose or performing an operation, function, or the like, the component, device, or element should be considered herein as being "configured to" meet that purpose or perform that operation or function.

Figure 1:
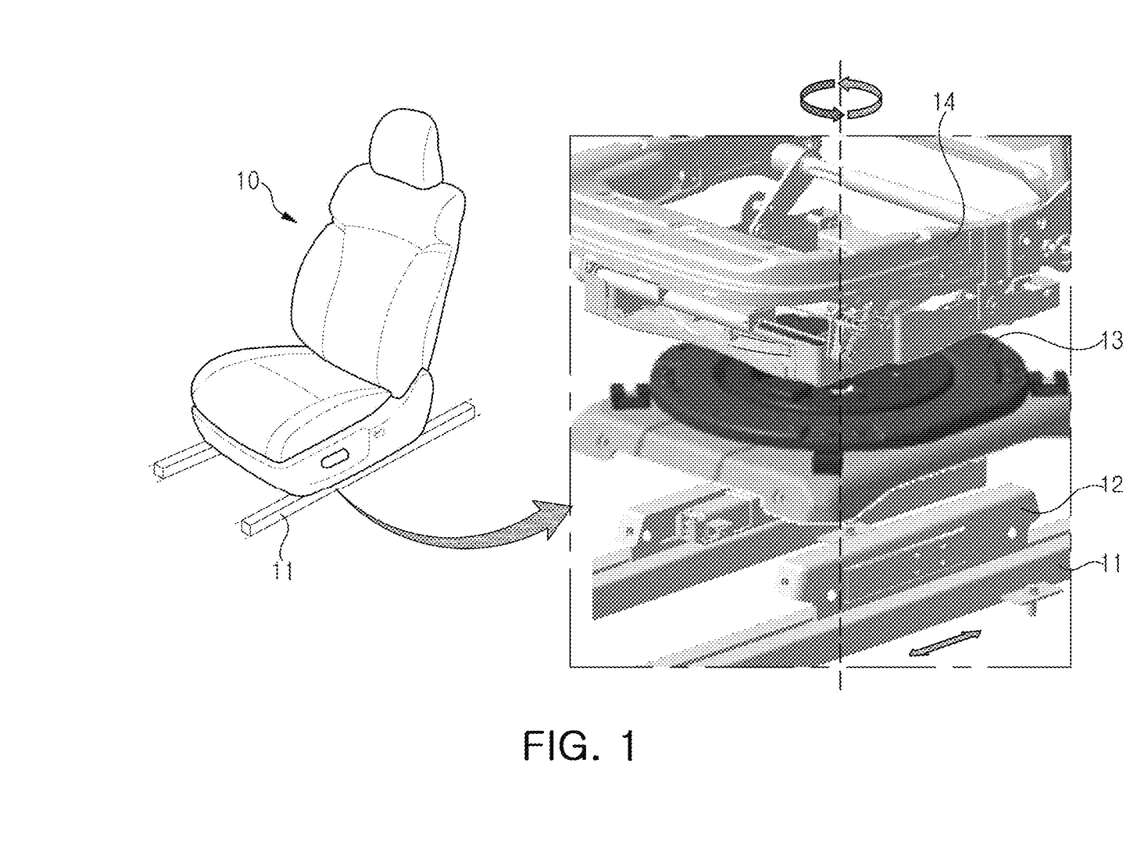
FIG. 1 is an exploded perspective view illustrating an example of a vehicle interior seat applicable to an apparatus for protecting a passenger according to an embodiment of the present disclosure.
Figure 2:
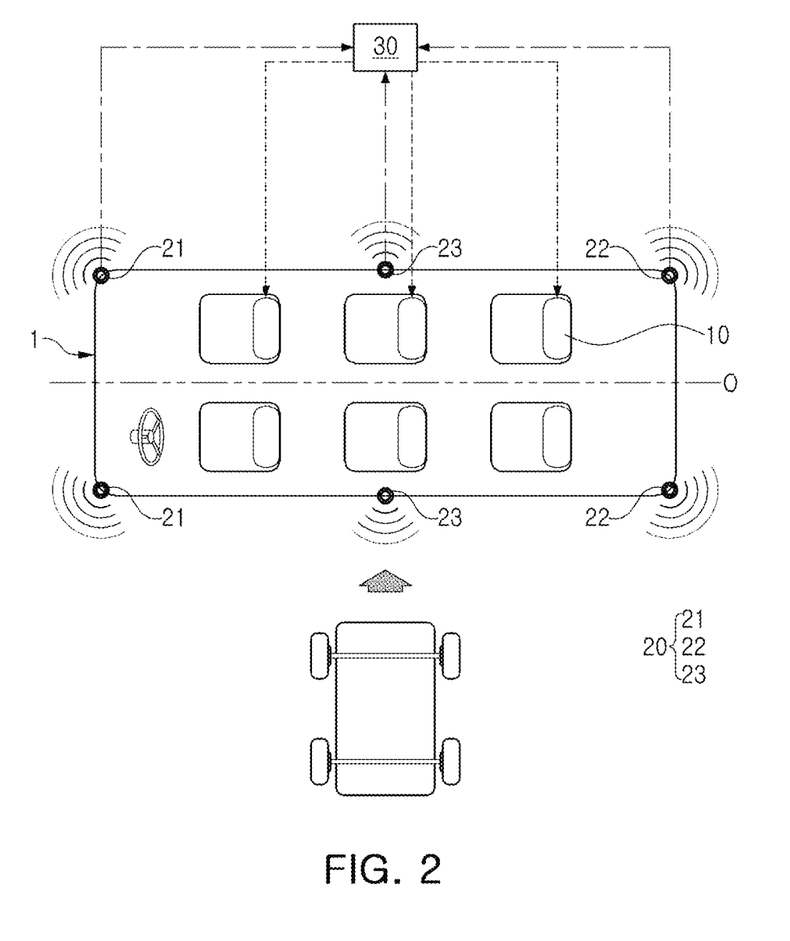
FIG. 2 is a diagram schematically illustrating a configuration of an apparatus for protecting a passenger according to an embodiment of the present disclosure.

FIG. 1 is an exploded perspective view illustrating an example of a vehicle interior seat applicable to an apparatus for protecting a passenger according to an embodiment of the present disclosure. FIG. 2 is a schematic diagram illustrating a configuration of an apparatus for protecting a passenger according to an embodiment of the present disclosure.

The apparatus for protecting a passenger of a vehicle according to an embodiment of the present disclosure may include at least one seat 10, a plurality of sensing units 20, and a controller 30.

The vehicle interior seat 10 applicable to an apparatus for protecting a passenger according to an embodiment of the present disclosure may move in a length direction of a vehicle 1, i.e., it may move forward and backward. Along with the forward and backward movement, a rotating operation by a swivel and a reclining operation of a seat back may be smoothly performed without interference in a limited space inside the vehicle.

At least one seat 10 has a slim-type structure having a relatively reduced volume with respect to the interior of the vehicle. For example, when a plurality of seats are provided, each seat may be arranged in a limited interior space of the vehicle so that forward and backward movement and a rotating operation may be performed automatically without interference with other adjacent seats or structures in the vehicle interior.

To this end, as illustrated in FIG. 1, the seat 10 applied to the present disclosure may include a rail 11 installed on a floor panel in the interior of the vehicle 1; a base frame 12 mounted on the rail 11 and being linearly movable in the length direction of the vehicle 1; a swivel core 13 mounted on the base frame 12 and being rotatable; and a seat frame 14 fixed on the swivel core 13.

A forward/backward driving mechanism may be interposed between the rail 11 and the base frame 12 so that the base frame 12 may move linearly, thereby enabling the seat frame 14 and the seat 10 to move forward and backward.

In addition, a swivel driving mechanism is interposed between the base frame 12 and the swivel core 13 so that the swivel core 13 may turn/rotate, thereby enabling the seat frame 14 and the seat 10 to turn/rotate.

Accordingly, the entire seat 10 (i.e., a seat back and a seat cushion) installed on the rail 11 and the base frame 12 via the swivel core 13 may be movable in the length direction of the vehicle 1 and may turn or rotate.

For reference, the forward/backward driving mechanism including the motor for forward and backward movement of the seat and the swivel driving mechanism including the motor for rotating the seat are not related to the essence of the present disclosure and may be variously designed and manufactured using a known transmission mechanism Thus, a detailed description of the configuration and operation of the driving mechanisms are omitted.

In addition, although a motor-driven forward/backward driving mechanism or swivel driving mechanism is described in the present disclosure, the present disclosure is not limited thereto. The forward/backward driving mechanism or swivel driving mechanism may be operated by a hydraulic actuator having an actuating rod or an electric actuator having an actuating rod.

The seat 10 having such a function may be applied to a driver's seat and a passenger seat located at the front of the vehicle 1. In addition, the aforementioned seats (e.g., seats having the functions described above) may be applied to the seats in the driver's seat row, which are present behind the driver's seat, and the seats in the passenger's seat row, which are present behind the passenger seat.

Alternatively, when there is no distinction between a driver's seat and a passenger seat, the seats having the functions described above may be applied to all seats in the vehicle interior.

The sensing units 20 may detect a collision between the vehicle 1 and an obstacle (not shown) and output a collision signal. In addition, when the vehicle 1 is operating normally, the sensing units 20 may continuously monitor whether the vehicle 1 collides with an obstacle.

A plurality of sensing units 20 may be installed at a plurality of positions in the vehicle 1. Although it is illustrated that, for example, a total of six sensing units 20 including four sensing units 20 arranged at four corners and two sensing units 20 in the middle of both sides of the vehicle 1 are installed, the number and positions of the sensing units 20 are not limited thereto.

For example, the plurality of sensing units 20 may be installed by including at least one sensing unit 20 on each of the front, rear, and both sides of the vehicle 1. Alternatively, at least one sensing unit 20 may be installed on the front and rear of the vehicle 1, respectively, and a plurality of sensing units 20 may be arranged on both sides of the vehicle 1.

The sensing unit 20 may include a sensor using lidar, radar, ultrasonic waves, or the like. Such a sensor may transmit a detection wave from the vehicle 1, detect an approaching obstacle by a reflected wave reflected from the obstacle, and output a collision signal to the controller 30 in case of a vehicle collision.

The configuration and operation of the sensing unit 20 are not limited to the examples described above, and for example, the sensing unit 20 may use image recognition using a camera.

When the collision signal of the vehicle 1 is input from the sensing unit 20, the controller 30 may determine a direction and location in which a collision occurs to the vehicle 1. The controller 30 may drive at least one of the forward/backward driving mechanism and the swivel driving mechanism of the seat 10 closest to an at least one collision region C according to the direction and location of the collision to control the corresponding seat to be selectively moved and/or turned or rotated.

The controller 30 may be electrically connected to, for example, the sensing unit 20 and the motors of the forward/backward driving mechanism and the swivel driving mechanism through at least one of wired, wireless, and wired/wireless communication.

For example, the controller may receive a collision signal from the sensing unit 20 through a controller area network (CAN), and may transmit a control signal to the forward/backward driving mechanism and the swivel driving mechanism through the CAN.

The controller 30 may be implemented with a memory, a microprocessor, or the like.

The memory stores data regarding an algorithm for controlling the operation of the components of the forward/backward driving mechanism and the swivel driving mechanism of the seat 10, in particular the motors. Alternatively, the memory may store a program reproducing the algorithm for controlling the operation of the components of the forward/backward driving mechanism and the swivel driving mechanism.

The microprocessor performs predetermined control of the components of the forward/backward driving mechanism and the swivel driving mechanism of the seat 10, particularly, the motors, using the data stored in the memory.

In addition, the controller 30, for example, may be incorporated into or used in combination with an electronic control unit (ECU) of the vehicle 1. Such a controller may control the overall operation of the apparatus for protecting a passenger according to an embodiment of the present disclosure.

When the collision signal output from the at least one sensing unit 20 is input to the controller 30, the controller 30 may determine the direction and location of the collision to the vehicle 1 (e.g., including the vehicle 1, relative to the vehicle 1) based on the position of the sensing unit 20 outputting the collision signal. According to the result or the direction and location of the collision, the controller 30 may select at least one seat 10 adjacent to the collision region C, i.e., closest to the sensing unit 20 that has transmitted the collision signal, and move the selected seat 10 away or turn or rotate the selected seat to avoid the impact.

In the selected seat 10, for example, the motor of the forward/backward driving mechanism starts to rotate upon receiving a control signal for driving from the controller 30, and a transmission mechanism connected to the motor operates so that the base frame 12 of the seat linearly moves forward and backward in the length direction of the vehicle 1 on the rail 11 of the floor panel. Thereby, the entire seat 10 is moved forward or backward.

In addition, in the selected seat 10, for example, the motor of the swivel driving mechanism starts to rotate upon receiving a control signal for driving from the controller 30, and a transmission mechanism connected to the motor operates so that the swivel core 13 of the seat 10 turns or rotates clockwise or counterclockwise on the base frame 12. Accordingly, the entire seat 10 fixed to the swivel core 13 turns in a set rotating direction and to a set rotating angle.

In the selected seat 10, when the forward/backward driving mechanism and/or the swivel driving mechanism operate under the control of the controller 30, safety equipment, such as a seat belt or an airbag, may also be controlled.

Accordingly, the apparatus for protecting a passenger of a vehicle 1 according to an embodiment of the present disclosure selectively moves and/or turns or rotates some of several seats in response to the direction and location of the collision to the vehicle 1, thereby protecting the passenger in the vehicle 1 from the impact of the collision or accident. The apparatus for protecting a passenger of a vehicle 1 may improve passenger protection and safety when a collision or accident occurs.

Figure 3A:
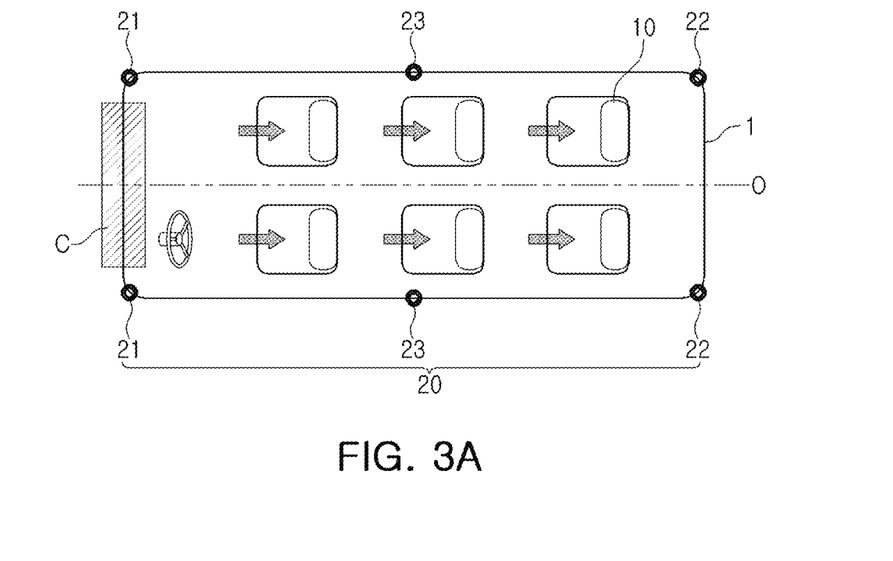
FIGS. 3A-3C are diagrams illustrating an operation of an apparatus for protecting a passenger according to an embodiment of the present disclosure in case of a front collision.
Figure 3B:
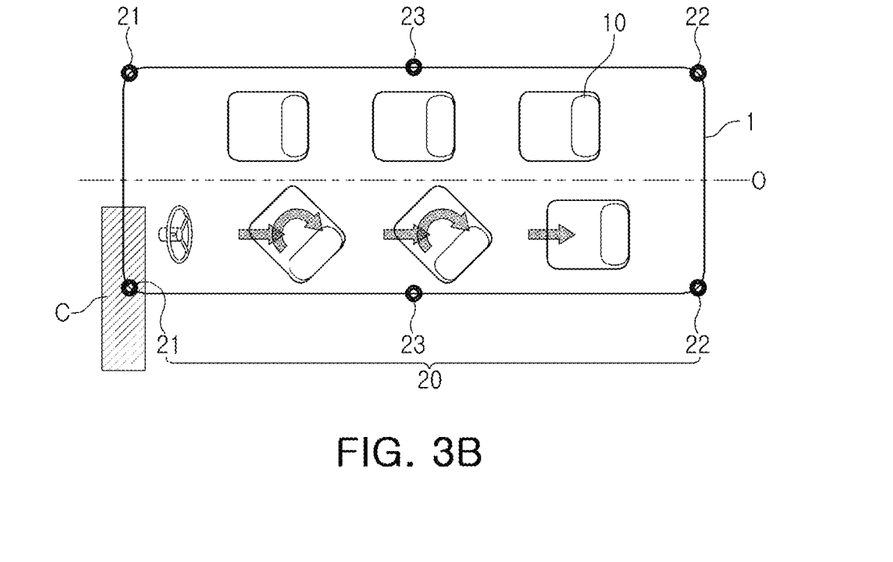
Figure 3C:
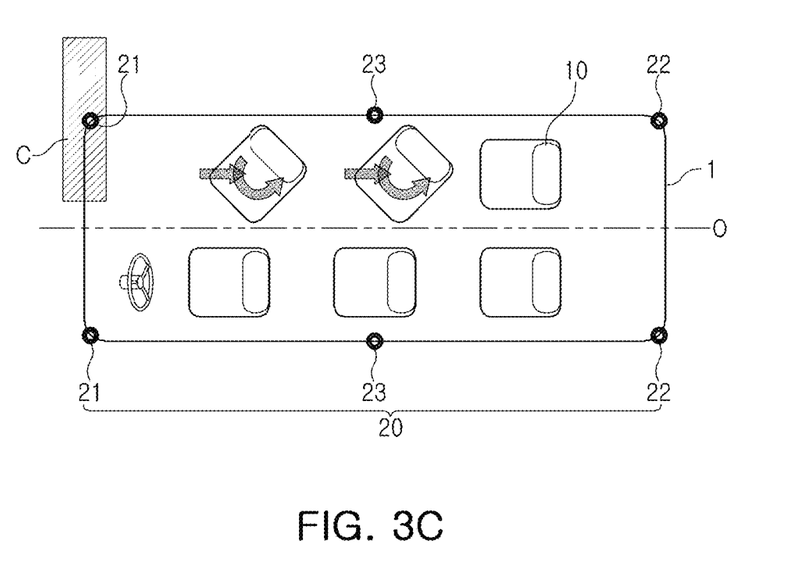

FIGS. 3A-3C are diagrams illustrating an operation of an apparatus for protecting a passenger according to an embodiment of the present disclosure in the case of a front collision.

As illustrated in FIG. 3A, when a front collision occurs in the center of the width direction of the vehicle 1, the front collision of the vehicle 1 is detected by both sensing units 21 located at the front or corners of the vehicle 1. The controller 30 may receive a collision signal transmitted from both sensing units 21 and determine the front collision is in the center of the vehicle 1.

The controller 30 may control at least both side seats 10 adjacent to the front of the vehicle 1 or at least some of the seats 10 or all of the seats 10 in the vehicle interior to move backward, thereby expanding a buffer space between the front of the vehicle 1 and the seats 10.

At least the seat 10 adjacent to the front of the vehicle 1 may be positioned backward compared to when the vehicle 1 is operating normally, so that the passenger on the seat 10 may be moved away from the collision region C of the vehicle 1 to be protected.

In this manner, when the passenger on the seat 10 is moved away from the collision region C of the vehicle 1 in case of the front collision, contact between the collision region of the vehicle 1 and the passenger may be avoided. Thereby, injuries to the passenger may be significantly reduced and a time for full deployment of the airbag may be guaranteed, so that an amount of shock absorption by the airbag may be reliably obtained.

As illustrated in FIGS. 3B and 3C, when a front collision deflected (e.g., offset, shifted) to either side of the width direction of the vehicle 1 occurs, the front collision of the vehicle 1 is detected by either side sensing unit 21 located at the front of the vehicle 1. The controller 30 may receive a collision signal transmitted from the corresponding sensing unit 21 and determine that a collision is a deflected front collision of the vehicle 1.

The controller 30 may control at least one side seat 10 corresponding to the deflected collision region C adjacent to the front of the vehicle 1 or seats 10 of a row corresponding to the deflected collision region to move backward to expand a buffer space between the front of the vehicle 1 and the seat 10.

At the same time, the controller 30 may control at least one side seat 10 corresponding to the deflected collision region C adjacent to the front of the vehicle 1 to turn or rotate to change a posture of the seat 10 so that the corner of the seat 10 faces the collision region of the vehicle 1.

The range of a rotating angle of the seat 10 may be set within approximately 30-60° with respect to a center line O extending in the length direction of the vehicle 1. In addition, the rotating direction may be set so that the front of the seat 10 faces the center line O extending in the length direction of the vehicle 1. Accordingly, when the seat 10 is rotated, the seat 10 (e.g., the front of the seat 10) and the center line extending in the length direction of the vehicle 1 are not parallel to each other.

At least the seat 10 corresponding to the deflected collision region C adjacent to the front of the vehicle 1 is positioned in a state located backward or more toward the rear of the vehicle 1 than when the vehicle 1 is operating normally, thereby moving the passenger on the seat 10 away from the collision region of the vehicle 1 to be protected.

Furthermore, since at least the seat 10 corresponding to the deflected collision region C adjacent to the front of the vehicle 1 is in a rotated state so as to deviate from the collision direction, the front of the passenger on the seat 10 is prevented from being exposed to the collision direction. Additionally, it is possible to prevent the collision region of the vehicle 1 from proceeding or extending into the interior of the vehicle 1 by the seat 10 being in contact with the collision region from the corner of the vehicle 1. At least, a moving direction of the collision region may be induced to deviate from proceeding or extending into the interior of the vehicle 10.

In this manner, when the passenger on the seat 10 is moved away from the collision region C of the vehicle 1 in case of a deflected front collision, contact between the collision region of the vehicle 1 and the passenger may be avoided. Thereby, injuries of the passenger may be significantly reduced and a time for full deployment of the airbag may be guaranteed, thereby obtaining the advantage of reliably obtaining an amount of shock absorption by the airbag.

In addition, when the seat 10 is rotated in case of a deflected front collision, the corner of the seat 10 may handle an impact before the passenger on the seat 10, thereby improving the protection performance of the vehicle 1 for the protecting the passenger. Even if the passenger is injured, an effect of reducing the degree of injury to a minor level may be obtained.

Figure 4A:
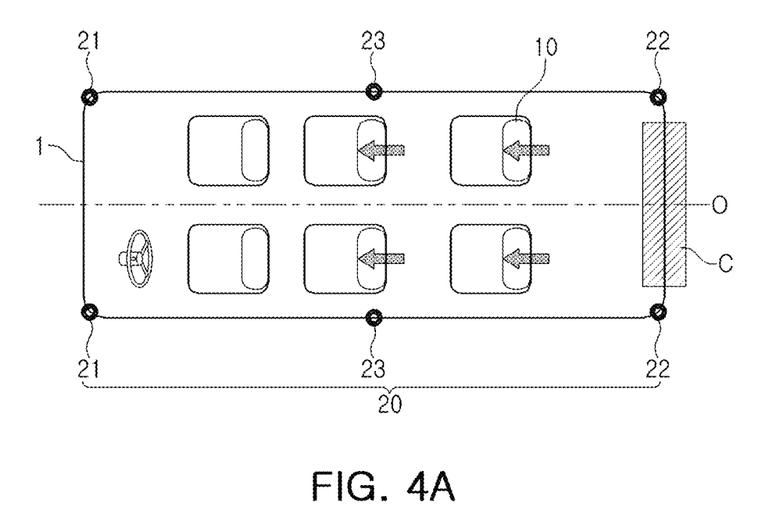
FIGS. 4A-4C are views illustrating an operation of an apparatus for protecting a passenger according to an embodiment of the present disclosure in case of a rear collision.
Figure 4B:
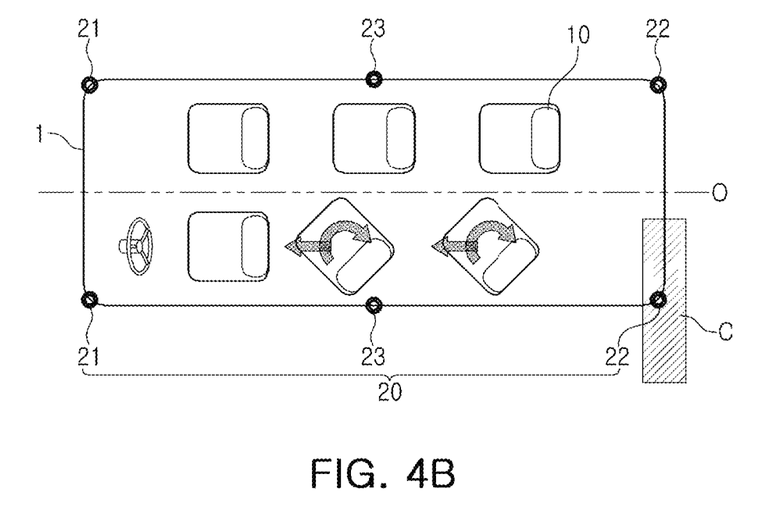
Figure 4C:
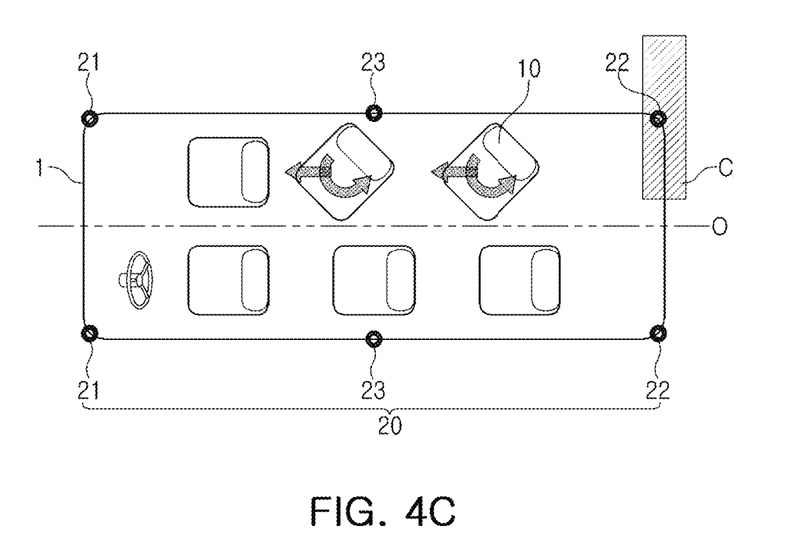

FIGS. 4A-4C are views illustrating an operation of an apparatus for protecting a passenger according to an embodiment of the present disclosure in case of a rear collision.

As illustrated in FIG. 4A, when a rear collision occurs in the center of the width direction of the vehicle 1, the rear collision of the vehicle 1 may be detected by both sensing units 22 located at the rear or corner of the vehicle 1, and the controller 30 may receive a collision signal transmitted from both sensing units 22 to determine the rear collision at the vehicle center.

The controller 30 may control at least both side seats 10 adjacent to the rear of the vehicle 1 or at least some of the seats 10 in the vehicle interior to move forward, thereby expanding a buffer space between the rear of the vehicle 1 and the seats 10.

At least the seat 10 adjacent to the rear of the vehicle 1 may be positioned further forward than when the vehicle 1 is operating normally, so that a passenger on the seat 10 may be moved away from the collision region C of the vehicle 1 to be protected.

In this manner, when the passenger on the seat 10 is moved away from the collision region C of the vehicle 1 in case of the rear collision, contact between the collision region of the vehicle 1 and the passenger may be avoided. Thereby, injuries to the passenger may be significantly reduced and a time for full deployment of the airbag may be guaranteed, so that an amount of shock absorption by the airbag may be reliably obtained.

As illustrated in FIGS. 4B and 4C, when a rear collision deflected to either side of the width direction of the vehicle 1 occurs, the rear collision of the vehicle 1 is detected by either side sensing unit 22 located at the rear of the vehicle 1. The controller 30 may receive a collision signal transmitted from the corresponding sensing unit 22 and determine that a collision is a deflected rear collision of the vehicle 1.

The controller 30 may control at least one side seat 10 corresponding to the deflected collision region C adjacent to the rear of the vehicle 1 or seats 10 of a row corresponding to the deflected collision region to move forward to expand a buffer space between the rear of the vehicle 1 and the seat 10.

At the same time, the controller 30 may control at least one side seat 10 corresponding to the deflected collision region C adjacent to the rear of the vehicle 1 to turn or rotate to change a posture of the seat 10 so that the corner of the seat 10 faces the collision region of the vehicle 1.

Similarly, the range of a rotating angle of the seat 10 may be set within approximately 30-60° with respect to a center line O extending in the length direction of the vehicle 1. In addition, the rotating direction may be set so that the front of the seat 10 faces the center line O extending in the length direction of the vehicle 1.

At least the seat 10 corresponding to the deflected collision region C adjacent to the rear of the vehicle 1 is positioned in a state located forward or more toward the front compared to when the vehicle 1 is operating normally, thereby moving the passenger on the seat 10 away from the collision region to be protected.

Furthermore, since at least the seat 10 corresponding to the deflected collision region C adjacent to the rear of the vehicle 1 is rotated to deviate from the collision direction, the seat 10 may handle the collision region of the vehicle 1 by the corner of the seat cushion together with the seat back. Additionally, it is possible to prevent the collision region of the vehicle 1 from proceeding or extending into the interior of the vehicle 1 by the seat 10 being in contact with the collision region from the corner of the vehicle 1. At least, a moving direction of the collision region may be induced to deviate from proceeding or extending into the interior of the vehicle 1.

In this manner, when the passenger on the seat 10 is moved away from the collision region C of the vehicle 1 in case of a deflected rear collision, contact between the collision region of the vehicle 1 and the passenger may be avoided. Thereby, injuries to the passenger may be significantly reduced and a time for full deployment of the airbag may be guaranteed, thereby obtaining the advantage of reliably obtaining an amount of shock absorption by the airbag.

In addition, when the seat 10 is rotated in case of a deflected rear collision, the seat 10 may handle an impact by the corner of the seat cushion together with the seat back, thereby improving the protection performance of the vehicle 1 for protecting the passenger. Additionally, even if the passenger is injured, an effect of reducing the degree of injury to a minor level may be obtained.

Figure 5A:
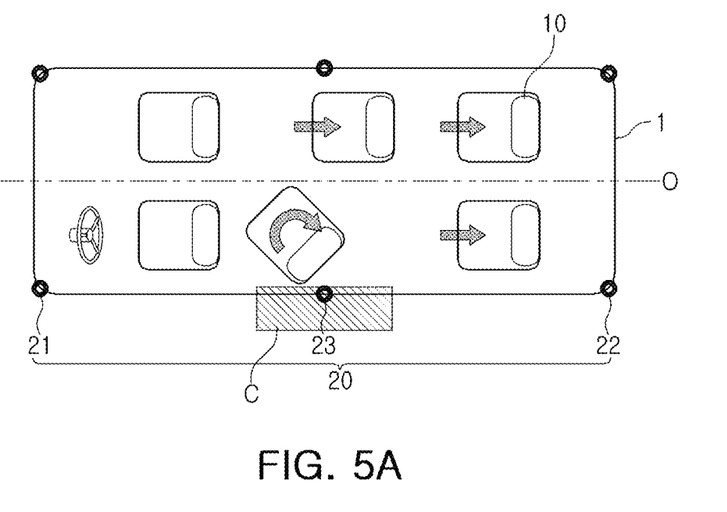
FIGS. 5A-5C are views illustrating an operation of an apparatus for protecting a passenger according to an embodiment of the present disclosure in case of a lateral collision.
Figure 5B:
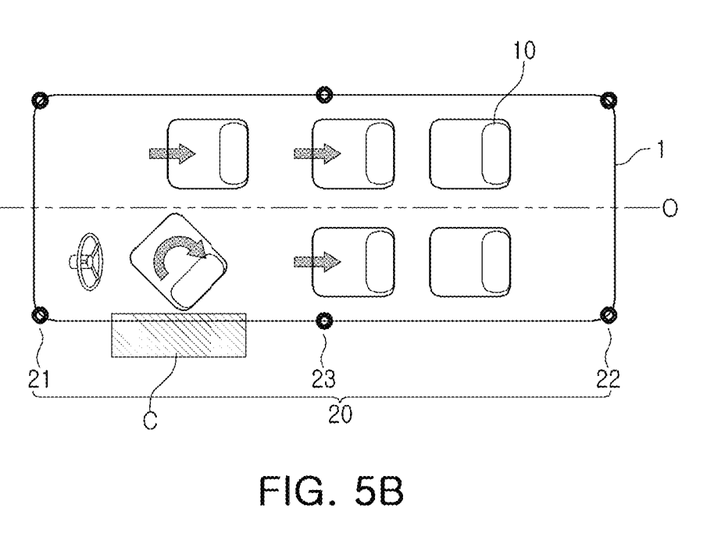
Figure 5C:
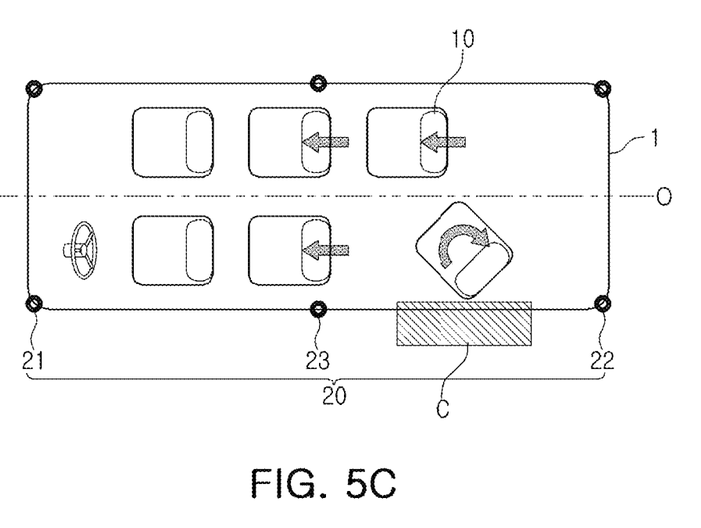

FIGS. 5A-5C are views illustrating an operation of an apparatus for protecting a passenger according to an embodiment of the present disclosure in case of a lateral collision.

When the vehicle 1 collides with an obstacle laterally, a side structure, such as a B-pillar or a door of the vehicle 1 is deformed, while a passenger moves toward the lateral collision region C of the vehicle 1 due to inertia. Due to this, a distance between the passenger and the side structure of the vehicle 1 is reduced and the passenger and the side structure of the vehicle 1 come into contact with each other, and an impact is mainly transmitted to the side and arms of the passenger, thereby causing injury.

When an airbag is provided on the side of the vehicle 1, the passenger may be prevented from directly colliding with the side structure of the vehicle 1 through the inflation of the airbag, but still, injury to the passenger is inevitably caused because the inflated airbag is hard.

Therefore, it is desirable to provide a method capable of lowering the degree of injury, while more effectively protecting the passenger by maintaining a distance as large as possible between the passenger and the side structure of the vehicle 1 during a lateral collision of the vehicle 1.

The apparatus for protecting a passenger according to an embodiment of the present disclosure may provide a method for improving the passenger protection performance and reducing the degree of injury by utilizing the function of the seat 10 without adding a separate component in case of a lateral collision.

As illustrated in FIG. 5A, when a lateral collision occurs in the center of the length direction of the vehicle 1, the lateral collision of the vehicle 1 is detected by the sensing unit 23 located on one side of the vehicle 1. The controller 30 may receive a collision signal transmitted from the corresponding sensing unit 23 and determine that the collision is a lateral collision in the center of the vehicle 1.

The controller 30 may control the seat 10 closest to the sensing unit 23 that has transmitted the collision signal to turn or rotate to change a posture of the seat 10 so that the corner of the corresponding seat 10 faces the collision region C of the vehicle 1.

A rotating angle range and a rotating direction of the seat 10 may be set to be the same as those described above.

In addition, the controller 30 may control other seats 10 in the vehicle interior adjacent to the sensing unit 23 that has transmitted the collision signal or the rotated seat 10 to move away from the corresponding sensing unit 23 or the rotated seat 10, thereby expanding a buffer space between the collision region C of the vehicle and each seat 10.

Although not illustrated, the controller 30 may selectively control the seat 10 closest to the sensing unit 23 that has transmitted the collision signal to move forwardly or backwardly. Accordingly, the corresponding seat 10 may be positioned, while avoiding a portion on which the amount of impact is concentrated in the collision region C of the vehicle 1, and thus, impact energy transmitted to the passenger may be minimized.

In this manner, in the case of a lateral collision in the longitudinal center of the vehicle 1, at least the seat 10 closest to the collision region C of the vehicle 1 is rotated to deviate from the collision direction, so that the seat 10 may handle the collision region of the vehicle 1 by the corner of the seat cushion together with the seat back. Additionally, it is possible to prevent the collision region of the vehicle 1 from proceeding or extending into the interior of the vehicle 1 by the seat 10 being in contact with the collision region from the corner. At least, a moving direction of the collision region may be induced to deviate from proceeding or extending into the interior of the vehicle 1.

Accordingly, the rotated seat 10 may maintain a distance between the passenger and the side structure of the vehicle 1 to be as far as possible, thereby improving the protection performance of the vehicle 1 for protecting the passenger. Additionally, even if the passenger is injured, an effect of reducing the degree of injury to a minor level may be obtained.

Furthermore, since the moved seats 10 are away from the collision region C, the passenger on the seat 10 may be present or located away from the collision region of the vehicle 1 to be protected.

As illustrated in FIGS. 5B and 5C, when a lateral collision deflected to either side in the length direction of the vehicle 1 occurs, the lateral collision of the vehicle 1 may be detected by the sensing unit 23 located on the side of the vehicle 1 and either side sensing units 21 and 22 located at the corners. The controller 30 may receive a collision signal transmitted from the corresponding sensing units 23 and 21 or 22 to determine that the collision is a deflected lateral collision of the vehicle 1.

The controller 30 may control the closest seat 10 to turn between the sensing units 23 and 21 or 22 that have transmitted the collision signal, so that a posture of the seat 10 may be changed so that the corner of the corresponding seat 10 faces the collision region C of the vehicle 1.

Although not illustrated, the controller 30 may selectively control the seat 10 closest between the sensing units 23 and 21 or 22 that has transmitted the collision signal to move forward or backward. Accordingly, the corresponding seat 10 may be positioned as to avoid a portion of the side of the vehicle 1 on which the amount of impact is concentrated in the collision region C of the vehicle 1, and thus, impact energy transmitted to the passenger may be minimized or reduced.

In addition, the controller 30 may control other seats 10 in the vehicle interior adjacent to the sensing units 23 and 21 or 22 that have transmitted the collision signal or the rotated seat 10 to move away from the corresponding sensing units 23 and 21 or 22 or the rotated seat 10, thereby expanding a buffer space between the collision region C of the vehicle 1 and each seat 10.

For example, when a forward deflected lateral collision occurs, other seats 10 in the vehicle interior adjacent to the rotated seat 10 may be controlled by the controller 30 to move backward to be located toward the rear, compared to when the vehicle 1 operates normally, so that the passenger on the seat 10 may be moved away from the collision region C of the vehicle 1 to be protected.

Conversely, when a backward deflected lateral collision occurs, other seats 10 in the vehicle interior adjacent to the rotated seat 10 may be controlled by the controller 30 to move forward to be located toward the front, compared to when the vehicle 1 operates normally, so that the passenger on the seat 10 may be moved away from the collision region C of the vehicle 1 to be safely protected.

Although not illustrated, optionally, the controller 30 may control other seats 10 in the vehicle interior adjacent to the rotated seat 10 to also turn.

In this manner, in the case of a lateral collision that is deflected to either side in the length direction of the vehicle 1, at least the seat 10 closest to the collision region C of the vehicle 1 is rotated to deviate from the collision direction, so that the seat 10 may handle the collision region of the vehicle 1 by the corner of the seat cushion together with the seat back. Additionally, it is possible to prevent the collision region of the vehicle 1 from proceeding or extending into the interior of the vehicle 1 by the seat 10 being in contact with the collision region from the corner of the vehicle 1. At least, a moving direction of the collision region may be induced to deviate from proceeding or extending into the interior of the vehicle 1.

Accordingly, the rotated seat 10 may maintain a distance as large as possible between the passenger and the side structure of the vehicle 1, thereby improving the protection performance of the vehicle 1 for protecting the passenger. Additionally, even if the passenger is injured, an effect of reducing the degree of injury to a minor level may be obtained.

Furthermore, since the moved seats 10 are away from the collision region C, the passenger on the seat 10 may be present or located away from the collision region of the vehicle 1 to be protected.

Hereinafter, a method for protecting a passenger using the apparatus for protecting a passenger of the present disclosure having the configuration and operation relationship described above is described.

Figure 6:
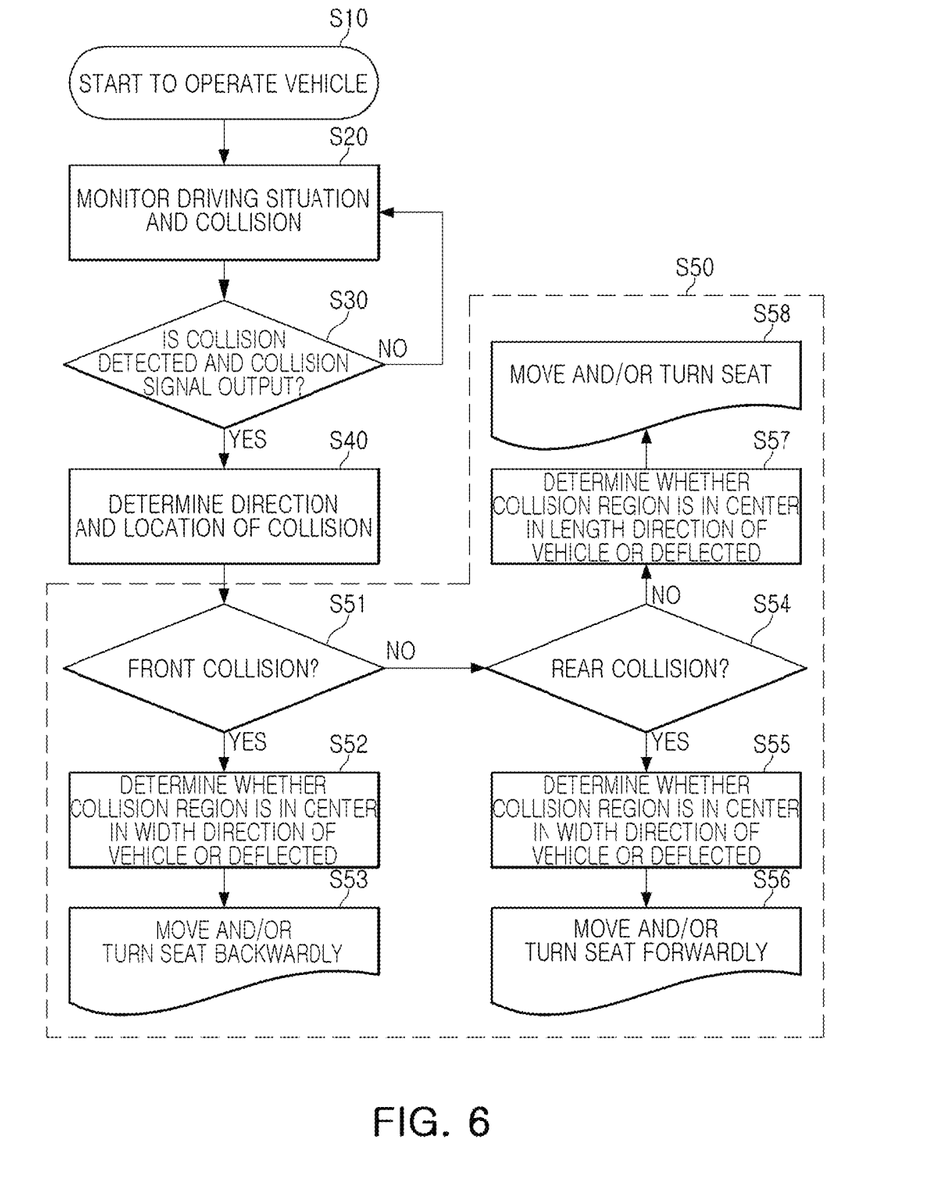
FIG. 6 is a flowchart illustrating a method for protecting a passenger according to an embodiment of the present disclosure.

FIG. 6 is a flowchart illustrating a method for protecting a passenger according to an embodiment of the present disclosure.

As shown, the method for protecting a passenger according to an embodiment of the present disclosure may include: detecting a collision of the vehicle 1 and outputting a collision signal (S30); determining a direction and location of the collision to the vehicle 1 according to a collision signal (S40); and selectively moving and/or rotating the seat 10 closest to at least the collision region C according to the direction and location of the collision (S50).

The seat 10 may be moved in the length direction of the vehicle 1, i.e., it may move forward and backward. Along with the forward and backward movement, a rotating operation by a swivel and a reclining operation of a seat back may be performed.

Specifically, when driving of the vehicle 1 starts (S10), the plurality of sensing units 20 installed in the vehicle 1 may monitor for a collision along with a driving situation (S20).

Subsequently, when a collision between an obstacle and the vehicle 1 is detected by at least one of the plurality of sensing units 20, the corresponding sensing unit 20 may output a collision signal to the controller 30 (S30).

When the collision signal of the vehicle 1 is input from the sensing unit 20, the controller 30 may determine a direction and location of the collision to the vehicle 1 based on the position of the sensing unit 20 outputting the collision signal (S40).

Next, the controller 30 may selectively control at least the seat 10 closest to the collision region C according to the direction and location of the collision to move and/or turn or rotate (S50).

The selectively moving and/or rotating of the seat 10 (S50) may include, for example: determining whether the vehicle 1 is in a front collision (S51); in the case of the front collision, determining whether a collision region C is in the center or deflected to either side in the width direction of the vehicle 1 (S52); and moving backward and/or rotating the selected seat 10 according to the location of the collision region (S53).

When a vehicle collision signal is input from the sensing unit 21 located at the front of the vehicle 1, the controller 30 may determine that the vehicle 1 is in the front collision (S51).

In addition, when all of the sensing units 21 located at, for example, both corners of the front of the vehicle 1 output a collision signal, the controller 30 may determine that the collision region C is in the center of the width direction at the front of the vehicle 1, while when only the sensing unit located at one corner outputs a collision signal, the controller may determine that the collision region is deflected to either side in the width direction at the front of the vehicle 1 (S52).

According to the result, the controller 30 performs control to move backward and/or turn or rotate the selected seats 10 according to the position of the collision region C (S53) as illustrated and described above with reference to FIGS. 3A-3C.

For example, when the collision region C is in the center in the width direction at the front of the vehicle 1, the controller 30 may control at least the seat 10 adjacent to the front of the vehicle 1 or at least some seats 10 in the vehicle interior to move backward to expand a buffer space between the front of the vehicle 1 and the seat(s) 10.

Alternatively, when the collision region C is deflected to either side in the width direction at the front of the vehicle 1, the controller 30 may control at least one side seat 10 corresponding to the deflected collision region C adjacent to the front of the vehicle 1 or seats 10 of a row corresponding to the deflected collision region to move backward to expand a buffer space between the front of the vehicle 1 and the seat(s) 10.

At the same time, the controller 30 may control at least one side seat 10 corresponding to the deflected collision region C adjacent to the front of the vehicle 1 to turn or rotate to change a posture of the seat 10 so that the corner of the seat 10 faces the collision region of the vehicle 1.

In the selectively moving and/or rotating of the seat 10 (S50) may include, for example: when it is determined that the vehicle 1 is not in a front collision, determining whether the vehicle 1 is in a rear collision (S54); in case of the rear collision, determining whether the collision region C is in the center or deflected to either side in the width direction of the vehicle 1 (S55); and moving forward and/or rotating the selected seat 10 according to a location of the collision region (S56).

When a vehicle collision signal is input from the sensing unit 22 located at the rear of the vehicle 1, the controller 30 may determine that the vehicle 1 is in a rear collision (S54).

In addition, when all of the sensing units 22 located at, for example, both corners at the rear of the vehicle 1 output a collision signal, the controller 30 may determine that the collision region C is in the center of the width direction at the front of the vehicle 1, while when only the sensing unit 22 located at one corner outputs a collision signal, the controller may determine that the collision region is deflected to either side in the width direction at the rear of the vehicle 1 (S55).

According to the result, the controller 30 performs control to move forward and/or turn the selected seats 10 according to the position of the collision region C (S56) as illustrated and described above with reference to FIGS. 4A-4C.

For example, when the collision region C is in the center in the width direction at the rear of the vehicle 1, the controller 30 may control at least the seat 10 adjacent to the rear of the vehicle 1 or at least some seats 10 in the vehicle interior to move forward to expand a buffer space between the rear of the vehicle 1 and the seat 10.

Alternatively, when the collision region C is deflected to either side in the width direction at the rear of the vehicle 1, the controller 30 may control at least one side seat 10 corresponding to the deflected collision region C adjacent to the rear of the vehicle 1 or seats 10 of a row corresponding to the deflected collision region to move forward to expand a buffer space between the rear of the vehicle 1 and the seat(s) 10.

At the same time, the controller 30 may control at least one side seat 10 corresponding to the deflected collision region C adjacent to the rear of the vehicle 1 to turn or rotate to change a posture of the seat 10 so that the corner of the seat 10 faces the collision region of the vehicle 1.

In the selectively moving and/or rotating of the seat 10 (S50) may include, for example: when it is determined that the vehicle 1 is in neither a front collision nor a rear collision, regarding the vehicle 1 as being in a lateral collision and determining whether the collision region C is in the center or deflected to either side in a length direction of the vehicle 1 (S57); and moving and/or rotating the selected seat 10 according to a location of the collision region (S58).

When only the sensing unit 23 located in the center of one side of the vehicle 1, for example, outputs a collision signal, the controller 30 may determine that the collision region C is in the center in the length direction at the side of the vehicle 1. When the sensing unit 21 or 22 located at one corner, together with the sensing unit 23 located on the side, output a collision signal, the controller may determine that the collision region is deflected to either side of the vehicle 1 in the length direction at the side of the vehicle 1 (S57).

According to the result, the controller may perform control to move and/or turn the selected seats 10 according to the position of the collision region C as illustrated and described above with reference to FIGS. 5A-5C (S58).

For example, the controller 30 may control the seat 10 closest to the sensing unit 23 that has transmitted the collision signal or the seat 10 closest between the sensing units 23 and 21 or 22 that has transmitted the collision signal to turn to change a posture of the seat 10 so that the corner of the corresponding seat 10 faces the collision region C of the vehicle 1.

In addition, the controller 30 may control other seats 10 in the vehicle interior adjacent to the sensing unit 23 and 21 or 22 that has transmitted the collision signal or the rotated seat 10 to move away from the corresponding sensing unit 23, 21, 22 that has transmitted the collision signal or the rotated seat 10, thereby expanding a buffer space between the collision region C of the vehicle 1 and the seat 10.

In the method for protecting a passenger according to an embodiment of the present disclosure, a direction and location of a collision in the vehicle 1 may be determined based on the position of the sensing unit 20 outputting a collision signal, and, according to the result, at least one seat 10 adjacent to the collision region C may be selected to move away or turn to avoid an impact.

As described above, according to the embodiments of the present disclosure, in case of external impact, impact energy transmitted to a passenger may be minimized by realizing rotation, position change, and space securing of an interior seat to handle a collision after sensor detection. By protecting the passenger from an impact of a collision accident, the effect of improving safety of the passenger may be obtained.

While embodiments of the present disclosure have been illustrated and described above, it should be apparent to those of ordinary skill in the art that modifications and variations to the illustrated and described embodiments can be made without departing from the scope of the present disclosure as defined by the appended claims.

What is claimed is:

1. An apparatus for protecting a passenger, the apparatus comprising:
   at least one seat disposed inside a vehicle, being movable in a length direction of the vehicle, and being rotatable;
   a plurality of sensing units installed in the vehicle and outputting a collision signal in a case of a vehicle collision; and
   a controller determining a direction and location of a collision to the vehicle in the case of the vehicle collision and controlling the at least one seat to be selectively moved and/or rotated according to the direction and location of the collision,
   wherein the controller determines the direction and location of the vehicle collision based on a position of a sensing unit of the plurality of sensing units outputting the collision signal, and
   wherein the controller selectively controls at least a seat closest to the sensing unit transmitting the collision signal to rotate so that a corner of the selected seat faces a collision region of the vehicle.

2. The apparatus of claim 1, wherein the seat includes:
   a rail installed inside the vehicle;
   a base frame mounted on the rail and being movable in the length direction of the vehicle by a forward/backward driving mechanism;
   a swivel core mounted on the base frame and being rotatable by a swivel driving mechanism; and
   a seat frame fixed on the swivel core.

3. The apparatus of claim 1, wherein, in the case of the vehicle collision, a rotating direction of the seat is set such that a front surface of the seat faces a center line extending in the length direction of the vehicle.

4. The apparatus of claim 1, wherein the plurality of sensing units are installed by including at least one sensing unit of the plurality of sensing units on a front, a rear, and left and right sides of the vehicle, respectively.

5. The apparatus of claim 1, wherein the plurality of sensing units are installed by including at least one sensing unit on each of four corners and left and right sides of the vehicle, respectively.

6. The apparatus of claim 1, wherein the controller moves the selected seat away from a collision region of the vehicle.

7. A method for protecting a passenger, the method comprising:
   detecting a vehicle collision and outputting a collision signal;
   determining a direction and a location in which a collision occurs to the vehicle based on the collision signal; and
   selectively moving and/or rotating at least a seat closest to a collision region according to the direction and location of the collision,
   wherein the selectively moving and/or rotating of the seat includes:
   determining whether the vehicle is in a front collision;
   in a case of the front collision, determining whether a collision region is in a center in a width direction of the vehicle or is deflected to either side; and
   moving the selected seat backward and/or rotating the selected seat according to a location of the collision region,
   wherein, in the moving backward and/or rotating the of the selected seat according to the location of the collision region,
   based on the collision region being in the center in the width direction at a front of the vehicle, at least a seat adjacent to the front of the vehicle is controlled to move backward without rotating, and
   based on the collision region being deflected to either side in the width direction at the front of the vehicle, at least a seat adjacent to the front of the vehicle and corresponding to the deflected collision region is controlled to rotate while moving backward.

8. The method of claim 7, wherein,
   in the determining of whether the collision region is in the center in the width direction of the vehicle or is deflected to either side,
   when all of a plurality of sensing units located at both corners of a front of the vehicle output the collision signal, a controller determines that the collision region is in the center in the width direction at the front of the vehicle, and
   when only one sensing unit located at any one corner, among the plurality of sensing units located at both corners of the front of the vehicle, outputs the collision signal, the controller determines that the collision region is deflected to one side in the width direction at the front of the vehicle.

9. The method of claim 7, wherein the selectively moving and/or rotating of the seat includes:
   when it is determined that the vehicle is not in a front collision, determining whether the vehicle is in a rear collision;
   in the case of the rear collision, determining whether the collision region is in the center in the width direction of the vehicle or is deflected to either side; and
   moving the selected seat forward and/or rotating the selected seat according to the location of the collision region.

10. The method of claim 9, wherein,
    in the determining of whether the collision region is in the center in the width direction of the vehicle or is deflected to either side,
    when all of a plurality of sensing units located at both corners of a rear of the vehicle output the collision signal, a controller determines that the collision region is in the center in the width direction at the rear of the vehicle, and
    when only one sensing unit located at any one corner, among the plurality of sensing units located at both corners of the rear of the vehicle, outputs the collision signal, the controller determines that the collision region is deflected to one side in the width direction at the rear of the vehicle.

11. The method of claim 9, wherein,
    in the moving forward and/or rotating of the selected seat according to the location of the collision region,
    when the collision region is in the center in the width direction at a rear of the vehicle, at least a seat adjacent to the rear of the vehicle is controlled to move forward, and when the collision region is deflected to either side in the width direction at the rear of the vehicle, at least a seat adjacent to the rear of the vehicle and corresponding to the deflected collision region is controlled to rotate while moving forward.

12. The method of claim 9, wherein, in the selectively moving and/or rotating the seat, when it is determined that the vehicle is not in the front collision nor the rear collision, it is regarded as a lateral collision of the vehicle, and it is determined whether the collision region is in the center in a length direction of the vehicle or deflected to either side; and moving and/or rotating the selected seat according to the location of the collision region.

13. A method for protecting a passenger, the method comprising:

detecting a vehicle collision and outputting a collision signal;

determining a direction and a location in which a collision occurs to the vehicle based on the collision signal; and selectively moving and/or rotating at least a seat closest to a collision region according to the direction and location of the collision, wherein in the selectively moving and/or rotating the seat, when it is determined that the vehicle is not in a front collision or a rear collision, the collision is regarded as a lateral collision of the vehicle, and it is determined whether the collision region is in the center in a length direction of the vehicle or deflected to either side, and wherein, in the determining of whether the collision region is in the center of the vehicle in the length direction or deflected to either side, when only a sensing unit located in the center of one side of the vehicle outputs the collision signal, a controller determines whether the collision region is in the center in the length direction at the side of the vehicle, and when a sensing unit located at any one corner outputs the collision signal, together with the sensing unit located in the center of the one side of the vehicle, the controller determines that the collision region is deflected to either side in the length direction at the side of the vehicle.

14. The method of claim 13, wherein, in the moving and/or rotating of the selected seat according to the location of the collision region, a seat closest to a sensing unit transmitting the collision signal or a seat closest between a plurality of sensing units transmitting the collision signal is controlled to rotate, and another seat adjacent to the sensing unit transmitting the collision signal or the rotated seat is controlled to move away from the sensing unit transmitting the collision signal or the rotated seat.

* * * * *